United States Patent [19]
Smith et al.

[11] Patent Number: 5,704,213
[45] Date of Patent: Jan. 6, 1998

[54] METHOD AND APPARATUS FOR CONTROLLING THE TEMPERATURE OF A DEVICE USING INDEPENDENT MULTI-STAGE THERMOELECTRIC COOLERS

[75] Inventors: Steven R. Smith, Madeira Beach; Clifford Molaskey, St. Petersburg, both of Fla.; Charles Donaldson, Lansdale, Pa.

[73] Assignee: Raytheon E-Systems, Inc., Dallas, Tex.

[21] Appl. No.: 696,599

[22] Filed: Aug. 14, 1996

Related U.S. Application Data

[60] Provisional application No. 60/002,349 Aug. 15, 1995.
[51] Int. Cl.⁶ .................................................. F25B 21/02
[52] U.S. Cl. ......................... 62/3.7; 62/3.2; 62/175; 165/290
[58] Field of Search ....................... 62/3.2, 3.3, 3.7, 62/335, 175; 236/78 B; 165/288, 290, 292

[56] References Cited

U.S. PATENT DOCUMENTS 4,066,365   1/1978   Staunton ........................... 62/3.2

*Primary Examiner*—John M. Sollecito
*Attorney, Agent, or Firm*—Harold E. Meier

[57] ABSTRACT

A method and apparatus for controlling the temperature of a device, wherein said method and device includes a plurality of thermoelectric coolers with independent temperature feedback control loops monitors and controls the temperature of a device. One thermoelectric cooler coupled to the package of the device maintains a desired temperature of the package by utilizing a first independent control loop. A second thermoelectric cooler coupled to the device maintains a desired temperature of the device by utilizing a second independent control loop. The operating temperature of the package of the device is maintained as the temperature of the environment varies.

15 Claims, 2 Drawing Sheets

METHOD AND APPARATUS FOR CONTROLLING THE TEMPERATURE OF A DEVICE USING INDEPENDENT MULTI-STAGE THERMOELECTRIC COOLERS

RELATED APPLICATION

This application claims the benefit of priority under 35 U.S.C. §119(e)(1) of Provisional Application No. 60/002,349, filed Aug. 15, 1995.

TECHNICAL FIELD

The present invention relates to a method and apparatus for controlling the temperature in an electrical device and, in particular, to a method and apparatus for temperature control including independently controlled multi-stage thermoelectric coolers.

BACKGROUND OF THE INVENTION

Numerous types of devices and components require operation at constant, or near constant, temperatures. Operation of such devices over a wide range of ambient and operating temperatures causes inefficiency and degradation of the devices without some means for temperature control. Present temperature controlled devices contain one heater/cooler or multiple heater/coolers in a series cascade. These heaters/coolers operate to maintain a desired operating temperature for a particular device, either increasing or decreasing device temperature depending on the temperature of the operating environment (i.e. ambient temperature or operating temperature).

In most applications, thermoelectric coolers (TEC) are used to stabilize or maintain the temperature of the device. Thermoelectric coolers (TEC) act as heat pumps for transferring heat energy. A single-stage thermoelectric cooler is composed of a matrix of thermoelectric couplers connected electrically in series and thermally in parallel. A TEC may contain any number of couplers positioned between two ceramic plates. These two plates form the top and bottom of the heater/cooler and act as the thermal conduit between the device being cooled (or heated) and a heat sink.

Regulating the direction and amount of current, with the use of a feedback loop and temperature controller, allows TEC's to cool, heat or stabilize temperature in the device in which the TEC is installed. Reversing the direction of current reverses the direction of heat pumping.

Many temperature controlled devices include an internal TEC that is constructed integrally within the device package to provide heat transfer between the device and the external casing or package (heat sinked surface). Ordinarily the casing or package is then coupled to a heat sink system. Generally, an internal thermistor is also provided which monitors the temperature of the device. The internal TEC is biased by monitoring the device temperature through the internal thermistor and a control loop is developed to maintain or control the temperature of the device.

Some packaged devices, such as diode laser packages, have internal TECs for controlling the temperature of the device within the package. The typical operating temperature range (temperature of the packaging or casing) for a diode laser package is between −20 degrees and +65 degrees Centigrade. Since most standard devices having an internal TEC have unyielding operating temperature ranges, these devices can only be operated within the rated temperature range. Further, in order to maintain a desired temperature of +25 degrees Centigrade for a laser diode device, the TEC must have the capacity to cool the laser diode by a delta T of 40 degrees Centigrade. Operation of the device package over such a wide range of operating temperatures, including quickly rising and falling temperatures, increases stress of both electrical and mechanical parts in the package. As a result, the diode laser device encounters the complete thermal stress of the environment. This stress reduces the reliability of the overall package and may increase part replacement costs. For example, the cost of a laser diode package may range between $4000.00 and $20,000.00, depending on the desired operating parameters. Additionally, a failure in the internal TEC contained in the laser diode package requires complete replacement of the laser diode package.

Accordingly, there exists a need for a system to control the operating temperature range of a temperature controlled device. There is also needed a thermal control device that reduces thermal stress in a temperature controlled device. Further, a need exists for creating a temperature controlled environment for reducing or minimizing thermal and electrical stress of both electrical and mechanical parts, thus increasing device reliability and reducing costs. Additionally, there is needed a system that allows operation of a temperature controlled device over extended temperatures beyond the operating temperature ratings of the device.

SUMMARY OF THE INVENTION

According to the present invention, there is provided a temperature controlled device that includes a first thermoelectric cooler for transferring thermal energy between a device and a first thermal conduit. A first thermistor positioned proximate the device generates a signal relating to the temperature of the device. A first independent control loop controls the operation of the first thermoelectric cooler in response to the first thermistor signal and a device temperature set point to control the temperature of the device. A second thermoelectric cooler transfers thermal energy between the first thermal conduit and a second thermal conduit. A second thermistor positioned on the first thermal conduit (i.e. the package of the device or the cold side of the second thermoelectric cooler) generates a signal relating to the temperature of the first thermal conduit. A second independent control loop controls the operation of the second thermoelectric cooler in response to the second thermistor signal and a device package temperature set point to control the temperature of the first thermal conduit.

DESCRIPTION OF THE DRAWINGS

For a more complete understanding of the present invention and the advantages thereof, reference is made to the following Detailed Description taken in conjunction with the accompanying Drawings wherein.

DETAILED DESCRIPTION

Figure 1:
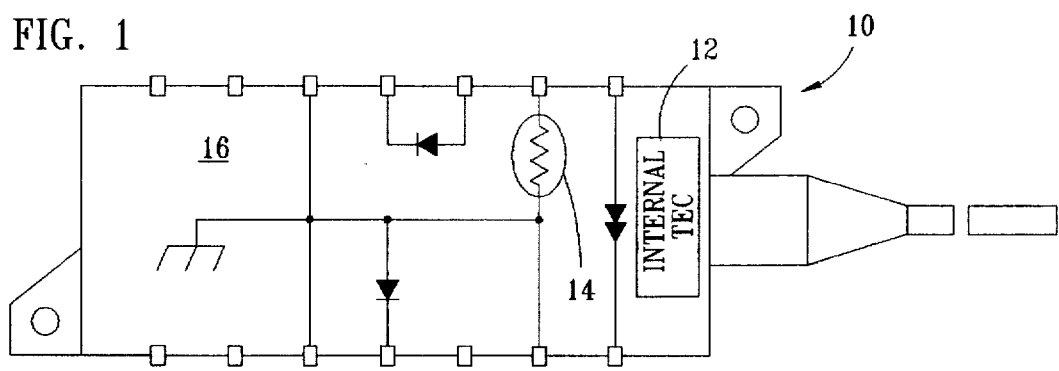
FIG. 1 illustrates a prior art temperature controlled laser diode package having an internal thermoelectric cooler and an internal thermistor.

With reference to the Drawings, like reference characters designate like or similar parts throughout the drawings.

With reference to FIG. 1, there is shown a typical prior art laser diode package 10. The package 10 includes an internal thermoelectric cooler (TEC) 12, an internal thermistor 14 and a laser diode device 16. The internal thermistor 14 monitors the temperature of the laser diode device 16 and generates an electrical signal in relation to the temperature of the laser diode device 16. An electrical feedback control loop (not shown) receives the signal from the thermistor 14 and provides a current or a voltage signal to the internal TEC 12. The control loop, internal thermistor 14 and internal TEC 12 operate in conjunction to maintain the operating temperature of the laser diode device 16 at a desired temperature. The internal TEC 12 cools or heats the laser diode device 16 by transferring thermal energy between the device and the bottom portion (or packaging) of the laser diode package 10. The bottom portion of the package 10 provides a thermal conduit for the transfer of thermal energy from, or to, the internal TEC 12. In most applications, the bottom (heat sink surface) of the laser diode package 10 is coupled to an appropriate heat sink system (not shown).

Typically, the feedback control loop (not shown) compares the electrical signal received from the internal thermistor 14 with an electrical signal related to the desired temperature of the laser diode device 16. In response to the electrical signal received from the internal thermistor 14, the feedback control loop generates a signal activating the internal TEC 12 in order to increase or decrease the temperature of the laser diode device 16. As such, the temperature of the laser diode device 16 is controlled to a desired temperature.

The laser diode package 10 as shown in FIG. 1 is manufactured by Mitsubishi Electric under the part No. FU-45SDF-38. This particular part has an operating temperature between −20 degrees to +65 degrees Centigrade with a desired laser diode operating temperature at +25 degrees Centigrade. As will be appreciated, any temperature controlled device or package may be used with the present invention. The Mitsubishi part No. FU-45SDF-38 is referred to for illustrative purposes only.

Figure 2:
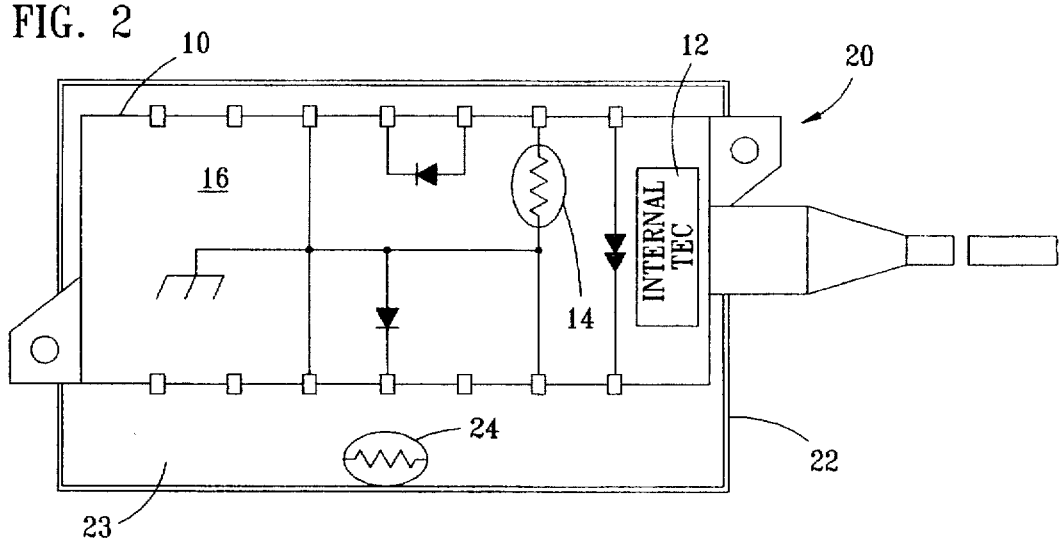
FIG. 2 illustrates the laser diode package shown in FIG. 1 coupled to an external thermoelectric cooler having an external thermistor in accordance with the present invention.

Now referring to FIG. 2, there is shown a temperature controlled device 20 in accordance with the present invention. The temperature controlled device 20 includes the laser diode package 10, an external thermoelectric cooler (TEC) 22 and an external thermistor 24. The laser diode package 10 is mounted or coupled to a "cold side" surface of the external TEC 22. The external thermistor 24 is mounted or connected to either the "cold side" surface 23 of the external TEC 22 or the surface of the laser diode package 10 and monitors the temperature of the package 10. In FIG. 2, the external thermistor is shown mounted or connected to the cold side surface of the external TEC 22. The external TEC 22 transfers thermal energy between the cold side surface and a hot side surface. In most applications, the hot side surface (heat sinked surface) of the external TEC 22 is also coupled to an appropriate heat sink (not shown).

Figure 3:
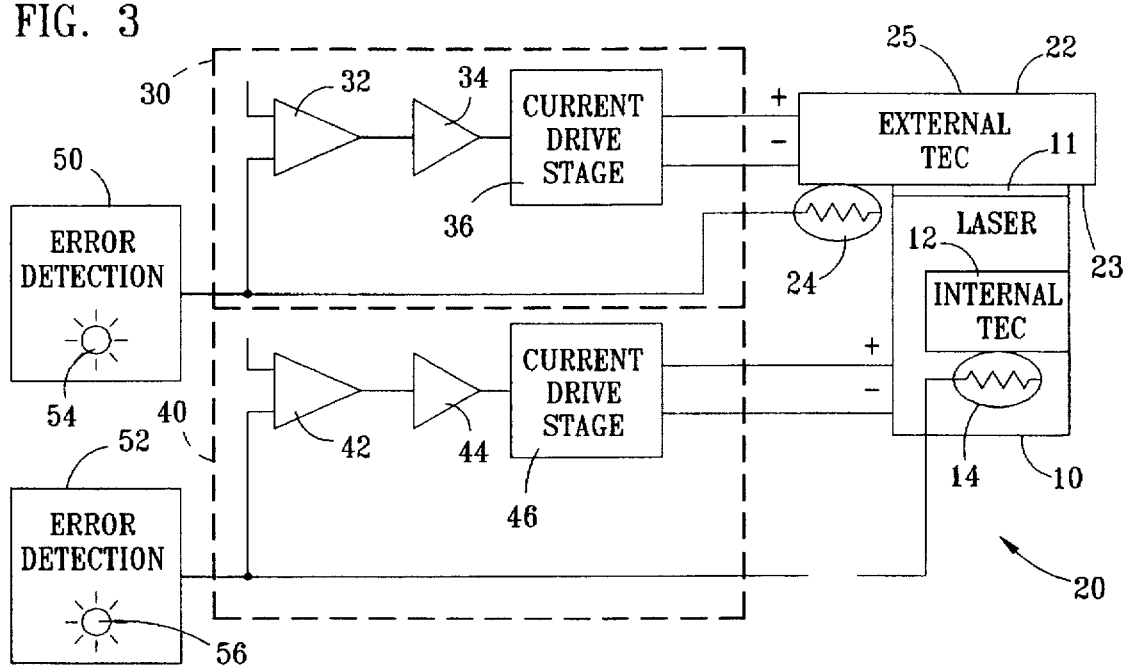
FIG. 3 is a block diagram showing independent drive circuits for the thermoelectric coolers used in accordance with the present invention.

Now referring to FIG. 3, there is illustrated a block diagram of a temperature control system for the temperature controlled device 20 including a first stage independent temperature feedback control loop 30 coupled to the external TEC 22 and the external thermistor 24, and a second stage independent temperature feedback control loop 40 coupled to the internal TEC 12 and the internal thermistor 14 of the laser diode package 10.

The first stage control loop 30 includes a bridge amplifier 32, an integrator 34 and a current drive stage 36. The output signal of the external thermistor 24 is compared to the desired package temperature set point of the diode laser package 10 and amplified by the bridge amplifier 32. The output of the bridge amplifier 32 is input to the integrator 34 with an output thereof coupled to the current drive stage 36. The drive stage 36 activates the external TEC 22 to transfer thermal energy between the cold side surface 23 coupled to the laser diode package 10 and a hot side surface 25 of the external TEC 22. As will be appreciated, the hot side surface 25 acts as a thermal conduit with a heat sink system (not shown) coupled to the hot side surface 25 of the external TEC 22. Accordingly, the temperature of the cold side surface 23 of the external TEC 22, as well as the laser diode package 10, is maintained at the desired package temperature set point. As will be appreciated, this cold side surface 23 of the external TEC 22 is also coupled to the surface of the laser diode package 10. As such, the temperature of the laser diode package 10 (casing or outside packaging) is maintained at the desired package temperature set point.

Temperature control of the external TEC 22 and the laser diode package 10 is referred to as "coarse" temperature adjustment. By providing temperature control of the entire package 10 at the desired temperature, the laser diode device 16 (See FIG. 2) and the internal TEC 12 within the laser diode package 10 are subject to a substantially reduced environmental (thermal) change.

Similarly, the second stage control loop 40 includes a bridge amplifier 42, an integrator 44 and a current drive stage 46. The output signal of the internal thermistor 14 is compared to the desired temperature set point of the laser diode device 16 and amplified by the bridge amplifier 42. The output of the bridge amplifier 42 is input to the integrator 44 with an output thereof coupled to the current drive stage 46. The drive stage 46 activates the internal TEC 12 to transfer thermal energy between the laser diode device 16 and a heat sinked surface 11 of the laser diode package 10. As will be appreciated, the heat sinked surface 11 of the laser diode package 10 acts as a thermal conduit and is coupled to the cold side surface 23 of the external TEC 22. Accordingly, the temperature of the laser diode device 16 within the laser diode package 10 is maintained at the desired device temperature set point. Temperature control of the laser diode device 16 using the internal TEC 12 of the laser diode package 10 is referred to as "fine" temperature adjustment.

As shown in FIG. 3, the present invention includes a first error detector 50 or a second error detector 52. The first error detector 50 receives the output signal from the thermistor 24. As set forth in the above description, the output signal from the thermistor 24 is related to the temperature of the laser diode package 10. The error detector 50 monitors the signal from the thermistor 24 and when the temperature of the laser diode package 10 varies outside a predetermined range an error condition is detected. The error detector 50 includes an alarm 54, such as an LED, for signaling or indicating that an error condition is present. An improperly functioning external TEC 22 is detected using the error detector 50.

Similarly, the second error detector 52 receives the output signal from the internal thermistor 14. The output signal from the internal thermistor 14 is related to the temperature of the laser diode device 16. The error detector 52 monitors the signal from the thermistor 14 and when the temperature of the laser diode device 16 varies outside a predetermined range an error condition is detected. The error detector 52 includes an alarm 56, such as a LED, for signaling or indicating that an error condition is present. As will be appreciated, one or both of the error detectors 50 and 52 may be used to detect whether there is an error in controlling the temperature of the laser diode device 16. When an error occurs and the device is not properly temperature controlled, utilization of both detectors 50 and 52 helps distinguish whether the problem exists with the internal TEC 12 or the external TEC 22.

In the preferred embodiment, the desired package temperature set point is higher than the desired laser diode device 16 temperature set point. For example, if using the Mitsubishi part no FU-45SDF-38, the desired temperature set points would be at about 32 degrees Centigrade for the package temperature and 25 degrees Centigrade for the laser diode device 16. This allows the internal TEC 12 in the laser diode package 10 to operate under a steady low power DC current, thus reducing stress on the laser diode package 10. Additionally, by choosing an external TEC capable of operating over a temperature range wider than the operating temperature of the laser diode package 10, the package is operated at temperatures beyond the rated temperature range of the package. In the specific embodiment, the external TEC 22 is a Marlow Industries thermoelectric cooler part No. 1064T that provides an operating temperature range between −40 degrees and +70 degrees Centigrade. It will be understood that the external TEC 22, when mounted to the laser diode package 10, is generally mounted to a circuit board or other means through thermal isolators. This provides isolation from other sources of thermal energy that may interfere with the operation of the thermoelectric coolers.

As will be appreciated, the present invention provides for an extra external TEC attached to a temperature controlled device or package. The external TEC provides a "coarse" temperature adjustment that controls and maintains the operating temperature of the package at a desired temperature. The internal TEC within the package provides a "fine" temperature adjustment that controls and maintains the temperature of the device within the package. Independent control loops monitor the temperatures of both the package and the device and independently control the thermoelectric coolers for separately controlling the desired temperatures of both the package and the device. The present invention allows the temperature controlled device to operate over wider temperature extremes, reduces thermal stress on the device and package caused by fast and substantial temperature changes, and subsequently increases the reliability of the device or package while allowing the "fine" temperature adjustment loop to achieve improved steady state accuracy.

The specific embodiment shown in FIG. 3 provides improved temperature control of the laser diode device 16 within the laser diode package 10 having the internal TEC 12 and the internal thermistor 14. As will be appreciated, the present invention may be used with packages or devices that do not have internal TECs and/or thermistors.

Figure 4:
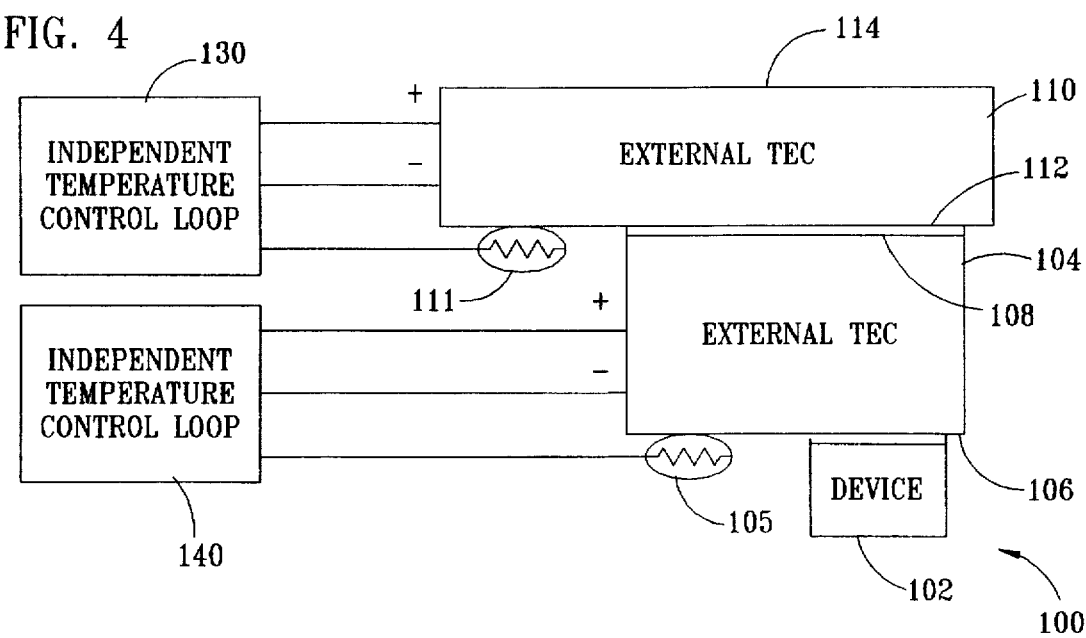
FIG. 4 is an alternative embodiment of a temperature controlled system in accordance with the present invention.

Now referring to FIG. 4, there is illustrated an alternate embodiment of a temperature controlled system 100 in accordance with the present invention. Temperature controlled system 100 includes a device 102 to be temperature controlled, a first external TEC 104 and a second external TEC 110. The device 102 is mounted or connected to a cold side surface 106 of the first external TEC 104. A thermistor 105 is also mounted or connected to the cold side surface 106. It will be understood that, alternately, the thermistor 105 may be mounted or connected to the device 102.

The first external TEC 104 further includes a hot side surface 108 mounted or connected to a cold side surface 112 of the second external TEC 110. A thermistor 111 is mounted or connected to the cold side surface 112 of the second external TEC 110. It will be understood that, alternatively, the thermistor 111 may be mounted or connected to the hot side surface 108 of the first external TEC 104. The second external TEC 110 further includes a hot side surface 114. The hot side surface 114 is normally coupled to a heat sink system (not shown).

An independent temperature control loop 140 receives an output signal from the thermistor 105 and controls the operation of the first external TEC 104 to maintain a desired temperature of the device 102. The independent temperature control loop 140 functions similar to the control loop 40 (shown in FIG. 3). Similarly, an independent temperature control loop 130 receives an output signal from the thermistor 111 and controls the operation of the second external TEC 110 to maintain a desired temperature of the first external TEC 104. The independent temperature control loop 130 functions similar to the control loop 30 (shown in FIG. 3).

As will be appreciated, the temperature controlled system 100 in accordance with the present invention, provides for controlling the temperature of the device 102. The second external TEC 110 controls the temperature of the first external TEC 104 (i.e. "coarse" temperature control). The first external TEC 104, in turn, controls the temperature of the device 102 (i.e. "fine" temperature control). It will be understood that the second external TEC 114 of the present invention encounters the complete thermal stress caused by a change in the environment while the first external TEC 110 and the device 102 are "buffered" from the thermal changes of the environment. It is further understood that whereas throughout this application the term "thermoelectric cooler" has been used such a component is in fact a heat pump and may be used for temperature control of a apparatus by either cooling or heating the apparatus.

Although several embodiments of the present invention have been described in the foregoing Detailed Description and illustrated in the accompanying Drawings, it will be understood by those skilled in the art that the invention is not limited to the embodiments disclosed but is capable Of numerous rearrangements, substitutions and modifications without departing from the spirit of the invention.

We claim:

1. Apparatus for controlling the temperature of a device comprising:
    a first thermoelectric cooler having a first thermal conduit, said first thermoelectric cooler in thermal contact with a device for transferring thermal energy between the device and the first thermal conduit in response to a first signal;
    a first thermistor positioned in thermal contact with the device for generating a second signal relating to the temperature of the device;
    means for comparing the second signal to a first predetermined temperature set point representing a desired temperature for the device and generating in response thereto the first signal;
    a second thermoelectric cooler in thermal contact with the first thermal conduit for transferring thermal energy between the first thermal conduit and a second thermal conduit in response to a third signal;
    a second thermistor positioned in thermal contact with the first thermal conduit for generating a fourth signal relating to the temperature of the first thermal conduit; and
    means for comparing the fourth signal to a second predetermined temperature set point representing a desired temperature for the first thermal conduit and generating in response thereto the third signal.

2. Apparatus for temperature control of a device comprising:

an internal thermoelectric cooler mounted within a device for transferring thermal energy internal to the device to an external thermoelectric cooler, said internal thermoelectric cooler having a first surface and a second surface;

an internal thermistor mounted within the device and generating an internal thermistor output signal related to the internal temperature of the device;

a first temperature feedback control for controlling the internal thermoelectric cooler in response the output signal of the internal thermistor;

an external thermoelectric cooler for transferring thermal energy external to the internal thermoelectric cooler to a thermal conduit, said external thermoelectric cooler having a first surface and a second surface, said first surface of said external thermoelectric cooler mounted to said second surface of the internal thermoelectric cooler;

an external thermistor mounted to the first surface of the external thermoelectric cooler and generating an external thermistor output signal related to the temperature of the first surface of the external thermoelectric cooler; and a second temperature feedback control for controlling the external thermoelectric cooler in response to the output signal of the external thermistor.

3. The apparatus for temperature control of claim 2 further including:

a first error detection circuit for detecting malfunctioning of said external thermoelectric cooler and generating a malfunction signal; and an alarm activated by said malfunction signal from the first error detection circuit.

4. The apparatus for temperature control of claim 3 further including:

a second error detection circuit for detecting malfunctioning of said internal thermoelectric cooler and generating a malfunction signal; and an alarm activated by said malfunction signal from the second error detection circuit.

5. Apparatus for temperature control of a laser diode comprising:

an internal thermoelectric cooler mounted within a laser diode package for transferring thermal energy internal to the laser diode package to an external thermoelectric cooler, said internal thermoelectric cooler having a first surface and a second surface;

an internal thermistor mounted to the laser diode package and generating an output signal related to the temperature of the laser diode package;

a first temperature feedback control for controlling the internal thermoelectric cooler in response to the output signal of the internal thermistor;

an external thermoelectric cooler for transferring thermal energy external to the laser diode package to a thermal conduit, said external thermoelectric cooler having a first surface and a second surface, said first surface of said external thermoelectric cooler in contact with the second surface of said laser diode package;

an external thermistor mounted to the first surface of the external thermoelectric cooler and generating an output signal related to the temperature of the first surface of the external thermoelectric cooler; and a second temperature feedback control for controlling the external thermoelectric cooler in response the output signal of the external thermistor.

6. The apparatus for temperature control of claim 5 further including:

a first error detection circuit for detecting malfunctioning of said external thermoelectric cooler and generating a malfunction signal; and an alarm activated by said malfunction signal from the first error detection circuit.

7. The apparatus for temperature control of claim 6 further including:

a second error detection circuit for detecting malfunctioning of said internal thermoelectric cooler and generating a malfunction signal; and an alarm activated by said malfunction signal from the second error detection circuit.

8. A method for controlling the temperature in a device comprising the steps of:

generating by means of a first external thermistor a first output signal related to the temperature of the device to be temperature controlled;

activating a first external thermoelectric cooler in response to the first output signal;

generating by means of a second external thermistor a second output signal representative of the temperature of the first thermoelectric cooler;

activating a second external thermoelectric cooler in response to the second output signal;

detecting an error in the operation of the first external thermoelectric cooler; and generating a first alarm signal.

9. A method for controlling the temperature of a device comprising the steps of:

generating by means of an internal thermistor a first output signal related to the temperature of the device to be temperature controlled;

activating an internal thermoelectric cooler in response to the first output signal;

generating by means of an external thermistor a second output representing the temperature of the internal thermoelectric cooler;

activating an external thermoelectric cooler in response to the second output signal;

detecting an error in the operation of the external thermoelectric cooler; and generating a first alarm signal.

10. The method for controlling the temperature of a device as set forth in claim 9 further including:

detecting an error in the operation of the internal thermoelectric cooler; and generating a second alarm signal.

11. The method for controlling temperature in a device as set forth in claim 9 further including the steps:

amplifying the output signal of the external thermistor by means of a first amplifier;

integrating the output signal of the first amplifier; and applying the integrated output signal of the first amplifier to a first drive stage stage to generate a signal for activation of the external thermoelectric cooler.

12. The method for controlling temperature in a device as set forth in claim 11 further including the steps:

amplifying the output signal of the internal thermistor by means of a second bridge amplifier;

integrating the output signal of the second amplifier; and applying the integrated output signal of the second amplifier to a second drive stage to generate a signal for activation of the internal thermoelectric cooler.

13. The method for controlling the temperature in a device as set forth in claim 8 further including:

detecting an error in the operation of the second external thermoelectric cooler; and generating a second signal.

14. The method for controlling temperature in a device as set forth in claim 8 further including the steps:

amplifying the output signal of the first external thermistor with a first amplifier;

integrating the output signal of the first amplifier; and applying the integrated output signal of the first amplifier to a first drive stage and generating a signal for activation of the first external thermoelectric cooler.

15. The method for controlling temperature in a device as set forth in claim 14 further including the steps:

amplifying the output signal of the second external thermistor with a second amplifier;

integrating the output signal of the second amplifier; and applying the integrated output signal of the second amplifier to a second drive stage and generating a signal for activation of the second external thermoelectric cooler.

* * * * *